US009956942B2

(12) United States Patent
Koshimizu et al.

(10) Patent No.: US 9,956,942 B2
(45) Date of Patent: May 1, 2018

(54) RESERVOIR

(71) Applicant: HITACHI AUTOMOTIVE SYSTEMS, LTD., Hitachinaka-shi, Ibaraki (JP)

(72) Inventors: Naganori Koshimizu, MinamiALPS (JP); Hiroshi Shimura, MinamiALPS (JP); Ryoichi Yagi, MinamiALPS (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 44 days.

(21) Appl. No.: 15/032,391

(22) PCT Filed: Oct. 29, 2014

(86) PCT No.: PCT/JP2014/078759
§ 371 (c)(1),
(2) Date: Apr. 27, 2016

(87) PCT Pub. No.: WO2015/064638
PCT Pub. Date: May 7, 2015

(65) Prior Publication Data
US 2016/0251006 A1    Sep. 1, 2016

(30) Foreign Application Priority Data

Nov. 1, 2013    (JP) .................................. 2013-228333

(51) Int. Cl.
*B60P 3/00*        (2006.01)
*B60T 11/26*       (2006.01)
(Continued)

(52) U.S. Cl.
CPC ............... *B60T 11/26* (2013.01); *B60T 11/22* (2013.01); *B60T 17/06* (2013.01)

(58) Field of Classification Search
CPC .......... B60T 11/26; B60T 11/10; B60T 17/06; B60T 11/22; B60T 11/16; B65D 88/128;
(Continued)

(56) References Cited

U.S. PATENT DOCUMENTS 6,105,611 A      8/2000  Ando et al.
6,984,000 B2 *   1/2006  Fraisse .................. B60T 8/4081
                                                  188/345
(Continued)

FOREIGN PATENT DOCUMENTS

JP    09-086389    3/1997
JP    11-020660    1/1999
(Continued)

OTHER PUBLICATIONS

International Search Report for PCT/JP2014/078759 dated Jan. 27, 2015, two pages.

*Primary Examiner* — Kareen Thomas
(74) *Attorney, Agent, or Firm* — Mattingly & Malur, PC

(57) ABSTRACT

Provided is a reservoir in which an inlet for injecting a liquid from the outside into a reservoir chamber in which the liquid is stored is provided at one side of a vehicle, a communication path that extends from the inlet toward the other side of the vehicle is provided, and a communication opening that is capable of making communication between the communication path and the reservoir chamber is formed. A surface part that gets higher from one side of the vehicle toward the communication opening of the other side of the vehicle in a state in which the reservoir chamber is mounted in the vehicle is formed at an upper portion of the reservoir chamber.

8 Claims, 11 Drawing Sheets

(51) Int. Cl.
*B60T 11/22* (2006.01)
*B60T 17/06* (2006.01)

(58) Field of Classification Search
CPC ...... B65D 88/748; B65D 90/34; B65D 90/52; B67D 2007/0474; B67D 7/78; B60K 15/00; B60K 15/03; B60K 15/03006
USPC ............ 220/564, 581–592, 4.12–4.17, 220/560.04–560.15; 137/571, 590, 592, 137/376
See application file for complete search history.

(56) References Cited

U.S. PATENT DOCUMENTS

| | | | |
|---|---|---|---|
| 7,261,382 B2* | 8/2007 | Hayashi | B60T 17/06 303/1 |
| 7,448,211 B2* | 11/2008 | Hayashi | B60T 11/26 60/534 |
| 8,197,012 B2* | 6/2012 | L'Aot | B60T 11/26 137/558 |
| 8,615,995 B2* | 12/2013 | Neumann | B60T 11/26 60/453 |

FOREIGN PATENT DOCUMENTS

| | | |
|---|---|---|
| JP | 2000-255410 A | 9/2000 |
| JP | 2005-047419 | 2/2005 |
| JP | 2010-76724 A | 4/2010 |

\* cited by examiner

RESERVOIR

TECHNICAL FIELD

The present invention relates to a reservoir that is provided for a vehicle to store a liquid.

This application is the U.S. national phase of International Application No. PCT/JP2014/078759 filed on Oct. 29, 2014 which designated the U.S. and claims priority to Japanese Patent Application No. 2013-228333, filed on Nov. 1, 2013, the entire contents of each of which are incorporated herein by reference.

BACKGROUND ART

There is a reservoir that is provided for a vehicle to store a liquid (e.g., see Patent Literature 1)

CITATION LIST

Patent Literature

Patent Literature 1

Japanese Unexamined Patent Application, First Publication No. H09-86389

SUMMARY OF INVENTION

Technical Problem

There is a need for a reservoir that allows a liquid to be satisfactorily injected during maintenance.

The present invention provides a reservoir that allows a liquid to be satisfactorily injected.

Solution to Problem

According to a first aspect of the present invention, a reservoir is configured such that: an inlet for injecting a liquid from an outside into a reservoir chamber in which the liquid is stored provided at one side of a vehicle; a communication path configured to extend from the inlet toward the other side of the vehicle is provided; and a communication opening configured to enable communication between the communication path and the reservoir chamber is formed. A surface part configured to get higher from the one side of the vehicle toward the communication opening of the other side of the vehicle in a state in which the reservoir chamber is mounted in the vehicle is formed at an upper portion of the reservoir chamber.

According to a second aspect of the present invention, a roof part is formed at the upper portion of the reservoir chamber, and the surface part is formed at a position recessed downward relative to the roof part.

According to a third aspect of the present invention, the reservoir further includes: an upper structure for which the inlet is provided; and a lower structure for which the reservoir chamber is provided. The upper structure and the lower structure are fastened to form a reservoir body. The surface part is formed at the upper structure.

According to a fourth aspect of the present invention, the communication opening is formed at a rear side of the reservoir chamber in a front/rear direction of the vehicle. The surface part is inclined such that a height position gets higher from a front side toward a rear side in the front/rear direction of the vehicle.

According to a fifth aspect of the present invention, a highest liquid level indicator line in the reservoir is formed at an upper position in a vertical direction relative to the surface part.

Advantageous Effects of Invention

According to the aforementioned reservoir, the liquid can be excellently injected.

DESCRIPTION OF EMBODIMENTS

First Embodiment

Figure 1:
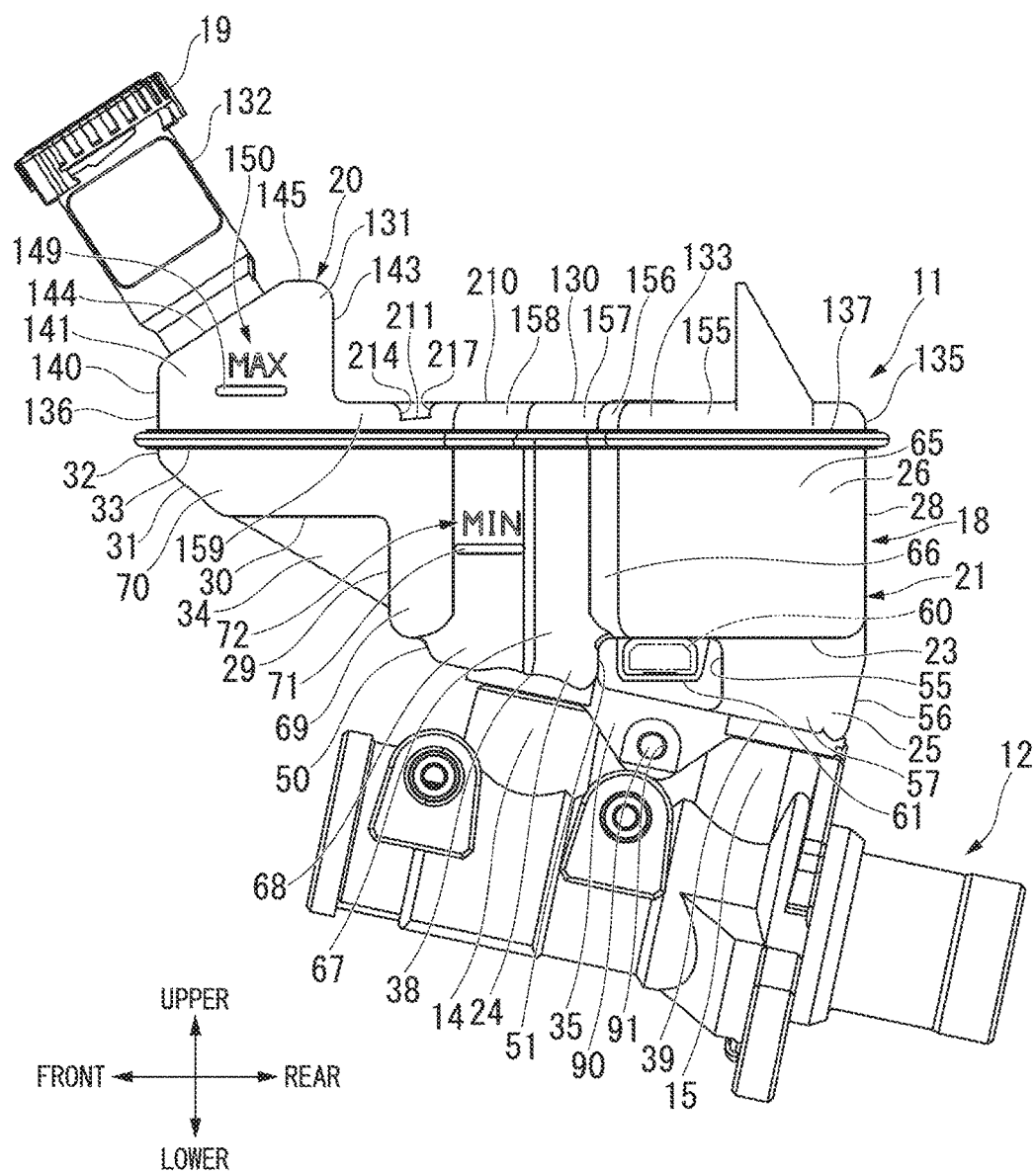
FIG. 1 is a side view illustrating a reservoir and a master cylinder of a first embodiment.

A reservoir of a first embodiment will be described on the basis of the drawings. The reservoir 11 of the present embodiment is mounted on a vehicle such as a four-wheeled vehicle. As illustrated in FIG. 1, the reservoir 11 is attached to a master cylinder 12 and is mounted in a vehicle. Here, a posture shown in FIG. 1 is a posture in the state in which the reservoir 11 and the master cylinder 12 are mounted in the vehicle. The reservoir 11 and the master cylinder 12 are mounted in the vehicle in such a manner that the left side in FIG. 1 becomes a front side when the vehicle moves forward. Front, back, left and right in the following description are front, back, left and right when the vehicle moves forward.

The master cylinder 12 is a brake master cylinder constituting a part of a braking device that performs braking of wheels. A liquid is stored in the reservoir 11. The reservoir 11 supplies the liquid to the master cylinder 12. The master cylinder 12 generates a brake fluid pressure, which is introduced into wheel cylinders (not illustrated) that are provided for the wheels to generate a braking force, in response to a brake operation of a driver or the like. Although not illustrated, the master cylinder 12 of the present embodiment is a tandem type that has two fluid pressure chambers back and forth to allow the brake fluid pressure to be generated at brake lines of two systems.

Figure 2:
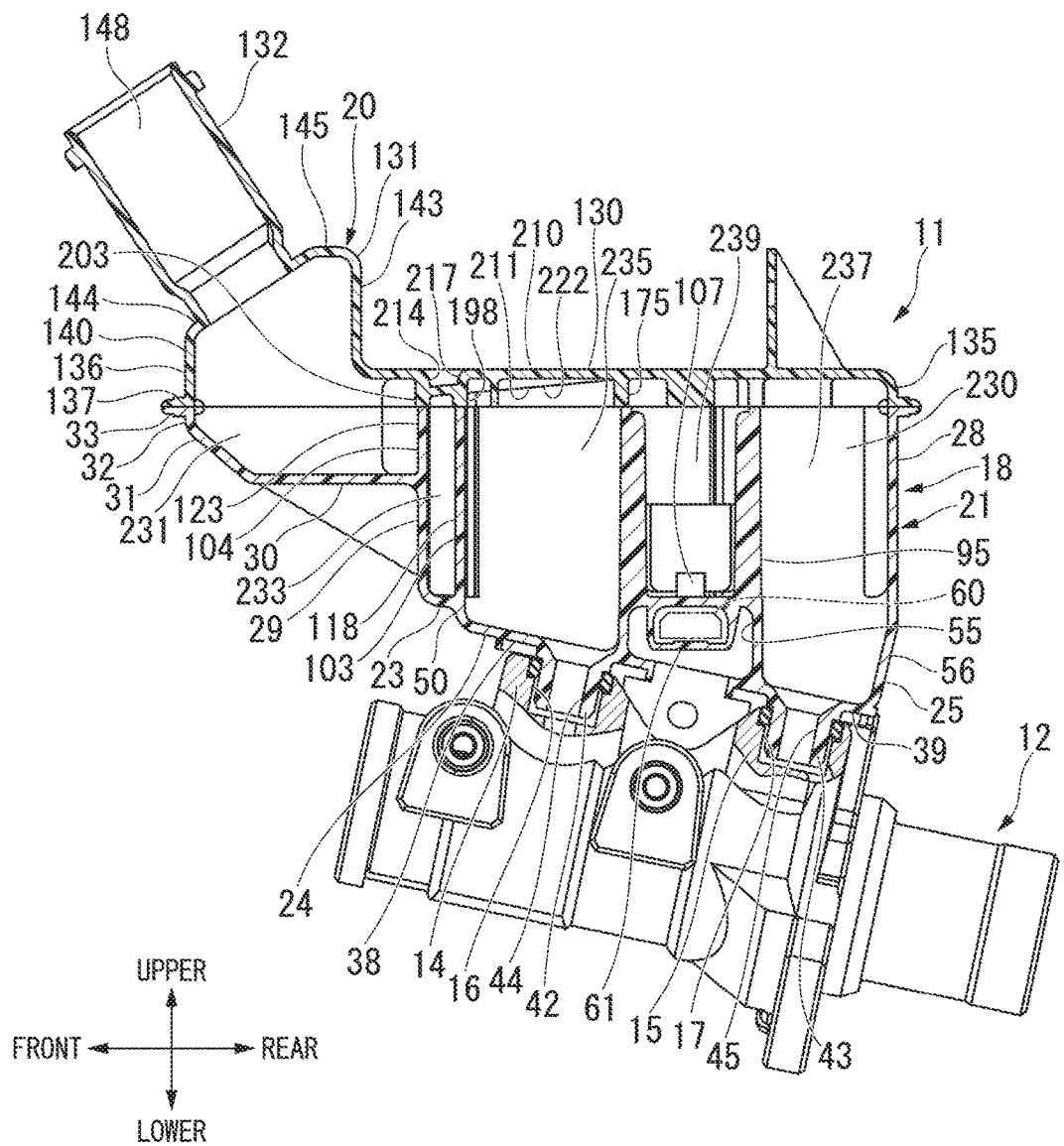
FIG. 2 is a side view of a cross section of a portion illustrating the reservoir and the master cylinder excluding a cap of the first embodiment.

The master cylinder 12 is mounted on a vehicle body side in a posture in which it is inclined slightly upward in the front thereof with respect to the horizontal. The master cylinder 12 is formed with a mounting boss part 14 at an upper front side thereof, and a mounting boss part 15 at an upper rear side thereof. These mounting boss parts 14 and 15 have respective upper surfaces that are flush with each other and are inclined slightly upward in the front thereof with respect to the horizontal. As illustrated in FIG. 2, the mounting boss part 14 is formed with a mounting hole 16 at right angles to an upper surface thereof. The mounting boss part 15 is also formed with a mounting hole 17 at right angles to an upper surface thereof. The reservoir 11 is mounted on these mounting holes 16 and 17. In this mounted state, the inside of the reservoir 11 communicates with each of the fluid pressure chambers in the master cylinder 12.

The reservoir 11 has a reservoir body 18 that is made of a certain synthetic resin having optical transparency and is illustrated in FIGS. 1 to 6, and a cap 19 that is removably attached to the reservoir body 18, is made of a synthetic resin, and is illustrated in FIG. 1. The reservoir body 18 is configured by fastening an upper structure 20 that is an integrally molded product and a lower structure 21 that is an integrally molded product by, for instance, welding, and thereby forming one body.

Figure 4:
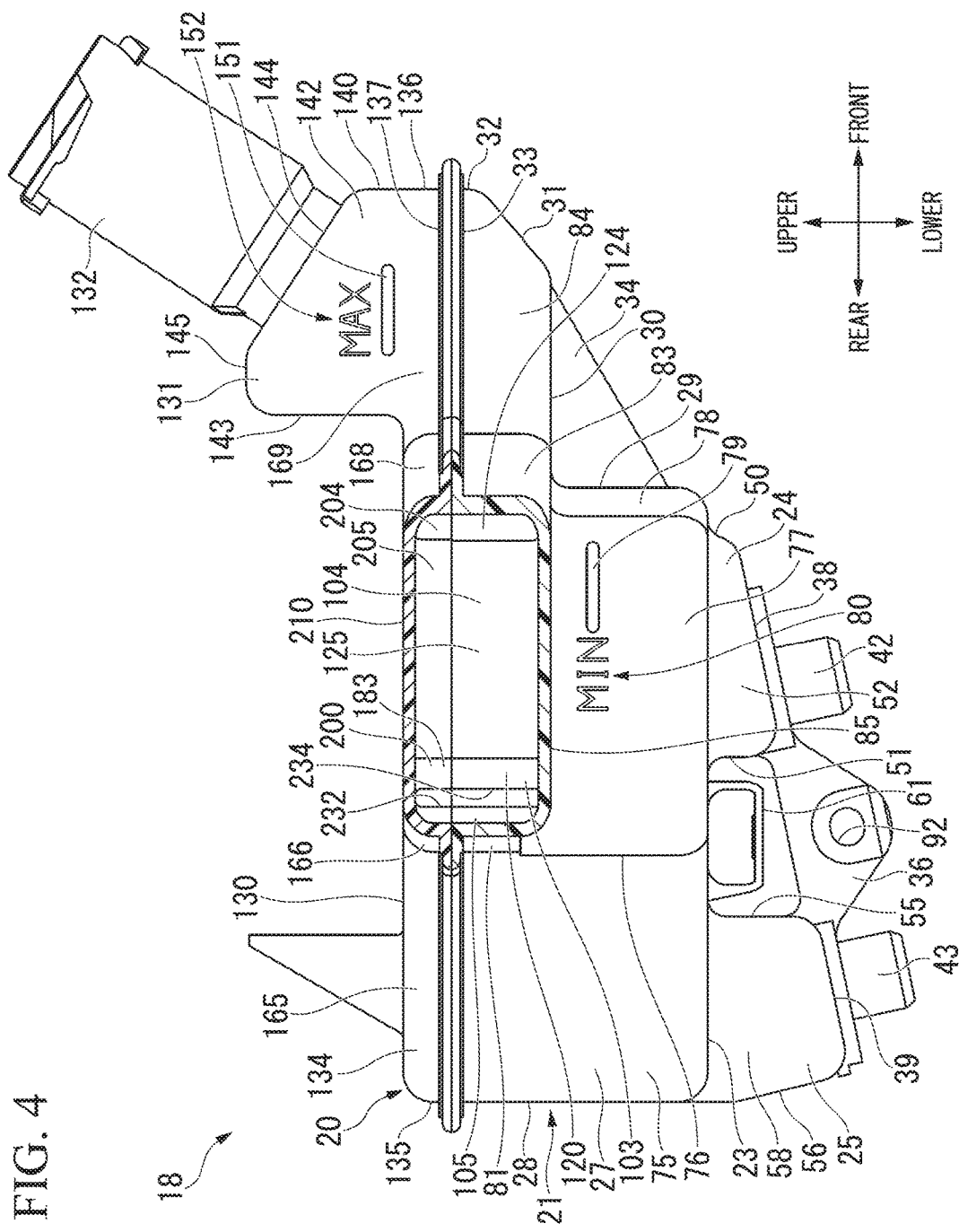
FIG. 4 is a sectional view of cross section A-A of FIG. 3.

As illustrated in FIG. 4, the lower structure 21 has an intermediate bottom part 23, a front downward protrusion part 24 that protrudes downward from a front portion of the intermediate bottom part 23, and a rear downward protrusion part 25 that protrudes downward from a rear portion of the intermediate bottom part 23. Also, the lower structure 21 has a sidewall 26 that, as illustrated in FIG. 1, mainly extends upward from an edge portion of a left side that is one side of the intermediate bottom part 23 in a left/right direction, and a sidewall 27 that, as illustrated in FIG. 4, extends upward from an edge portion of a right side that is opposite to one side of the intermediate bottom part 23 in the left/right direction. Further, the lower structure 21 has a rear end wall 28 of a rear end thereof, an intermediate front wall 29 of a front portion thereof, a front bottom part 30 of the front portion thereof, an oblique wall 31 of the front portion thereof, a front end wall 32 of a front end thereof, a joined flange part 33 of an upper end thereof, a reinforced plate part 34 of a lower portion thereof, a coupling plate part 35 illustrated in FIG. 1, and a coupling plate part 36 illustrated in FIG. 4. The lower structure 21 is mounted in a vehicle in a posture in which the rear end wall 28 and the front end wall 32 are orthogonal to a front/rear direction of the vehicle.

As illustrated in FIG. 2, the front downward protrusion part 24 has a front placement bottom part 38 that is placed on an upper surface of the mounting boss part 14 at the front side of the master cylinder 12. The rear downward protrusion part 25 has a rear placement bottom part 39 that is placed on an upper surface of the mounting boss part 15 at the rear side of the master cylinder 12.

Since these front and rear placement bottom parts 38 and 39 are placed on the upper surfaces of the mounting boss part 14 and 15 disposed on the same plane on respective lower surfaces thereof, the respective lower surfaces thereof are disposed on the same plane and are inclined slightly upward in the front thereof with respect to the horizontal. A mounting protrusion part 42 protruding vertically downward with respect to the front placement bottom part 38 is formed at an intermediate position of the front placement bottom part 38. A mounting protrusion part 43 protruding vertically downward with respect to the rear placement bottom part 39 is also formed at an intermediate position of the rear placement bottom part 39.

A communication hole 44 passing through the inside and outside of the reservoir body 18 is formed in the middle of the mounting protrusion part 42. A communication hole 45 passing through the inside and outside of the reservoir body 18 is also formed in the middle of the mounting protrusion part 43. The reservoir body 18 is mounted in the aforementioned mounting holes 16 and 17 of the mounting boss parts 14 and 15 of the master cylinder 12 at the mounting protrusion part 42 and 43. The fluid pressure chambers of the master cylinder 12 can communicate via the mounting holes 16 and 17 of these mounting boss parts 14 and 15.

Figure 7:
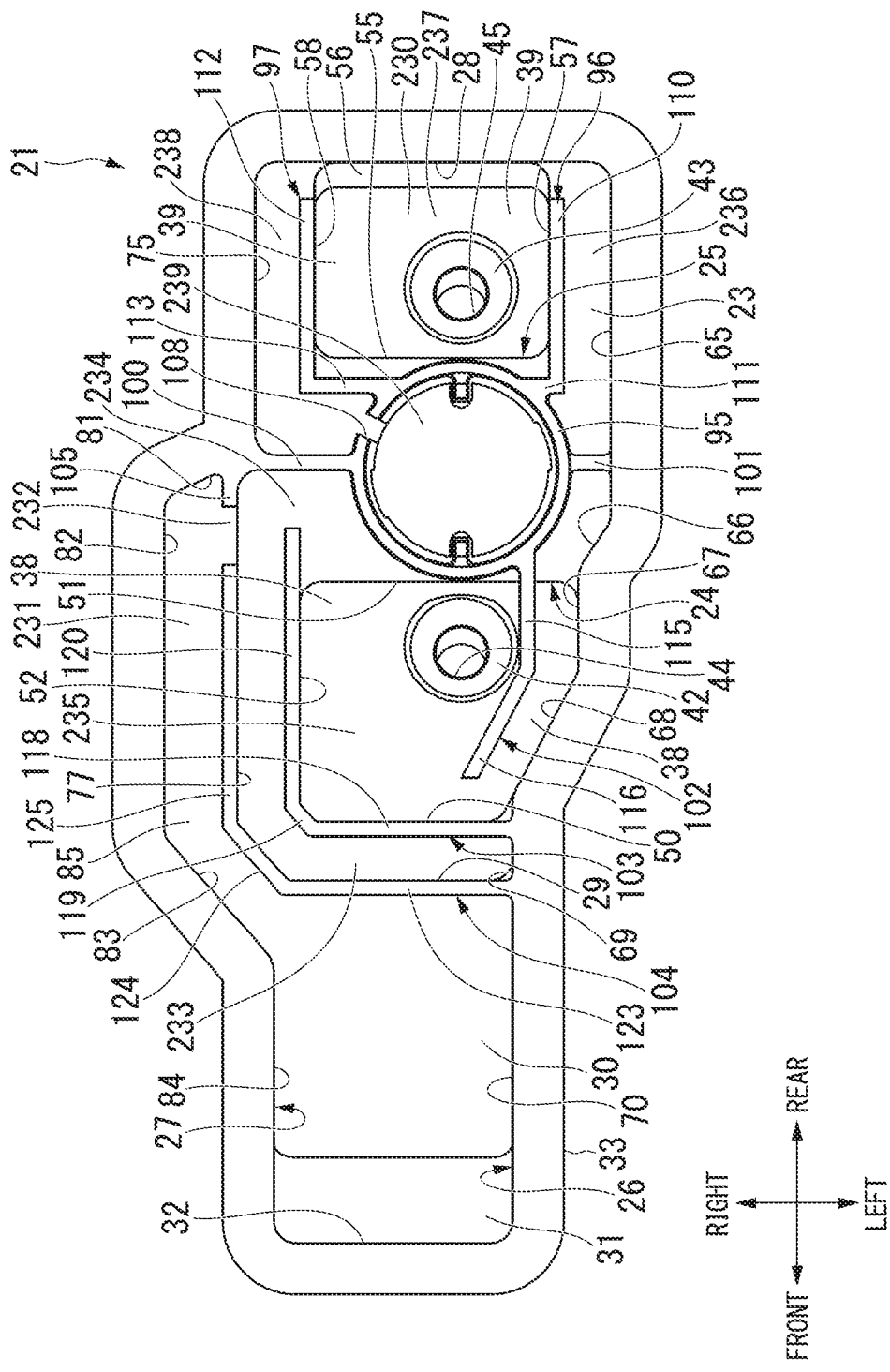
FIG. 7 is a top view illustrating a lower structure of the reservoir of the first embodiment.

As illustrated in FIG. 4, the front downward protrusion part 24 has a front wall part 50 that extends upward from a front edge portion of the front placement bottom part 38, a rear wall part 51 that extends upward from a rear edge portion of the front placement bottom part 38, and a sidewall part 52 that extends upward from a right-hand edge portion of the front placement bottom part 38. A lower portion of the aforementioned sidewall 26 as illustrated in FIG. 1 is coupled to a left-hand edge portion of the front placement bottom part 38. In other words, as illustrated in FIG. 7, a range surrounded with the front wall part 50, the rear wall part 51, the sidewall part 52, and the sidewall 26 becomes the front placement bottom part 38, and the mounting protrusion part 42 is formed within this range.

The rear downward protrusion part 25 has a front wall part 55 that extends upward from a front edge portion of the rear placement bottom part 39 as illustrated in FIG. 4, a rear wall part 56 that extends upward from a rear edge portion of the rear placement bottom part 39, a sidewall part 57 that extends upward from a left-hand edge portion of the rear placement bottom part 39 as illustrated in FIG. 1, and a sidewall part 58 that extends upward from a right-hand edge portion of the rear placement bottom part 39 as illustrated in FIG. 4. In other words, as illustrated in FIG. 7, a range surrounded with the front wall part 55, the rear wall part 56, the sidewall part 57, and the sidewall part 58 becomes the rear placement bottom part 39, and the mounting protrusion part 43 is formed within this range. As illustrated in FIG. 1, a lower surface of a portion between the front and rear downward protrusion parts 24 and 25 of the intermediate bottom part 23 is formed with a switch mounting part 61 on which a level indicator switch 60 is mounted.

The sidewall 26 has a rear wall part 65, a rear oblique wall part 66, an intermediate wall part 67, a front oblique wall part 68, a front wall part 69, and a front end wall part 70. The rear wall part 65 extends vertically forward from a left-hand end edge portion of the rear end wall 28 in the front/rear direction. As illustrated in FIG. 7, the rear oblique wall part 66 extends obliquely from a front end edge portion of the rear wall part 65 toward the front side to be located at a right side that is an inner side in the left/right direction. The intermediate wall part 67 extends forward from a front end edge portion of the rear oblique wall part 66 in parallel with the rear wall part 65. The front oblique wall part 68 extends obliquely from a front end edge portion of the intermediate wall part 67 toward the front side to be located at the inner side in the left/right direction. The front wall part 69 extends forward from a front end edge portion of the front oblique wall part 68 in parallel with the intermediate wall part 67. As illustrated in FIG. 1, the front end wall part 70 extends forward from an upper end portion of the front wall part 69 to be flush with this upper end portion. A lower portion of the intermediate wall part 67 and a lower portion of the front oblique wall part 68 constitute the front downward protrusion part 24. A lowest liquid level indicator line 71 that indicates a lowest liquid level is formed horizontally on an outer surface of the front oblique wall part 68 to protrude outward. An indicator part 72 with the letters "MIN" indicating that a liquid level is the lowest liquid level is formed above this lowest liquid level indicator line 71 to protrude outward.

As illustrated in FIG. 4, the sidewall 27 has a rear wall part 75, a lateral extension wall part 76, an intermediate wall part 77, and an oblique wall part 78. The rear wall part 75 extends vertically forward from a right-hand end edge portion of the rear end wall 28 in the front/rear direction. The lateral extension wall part 76 extends from a front end edge portion of the rear wall part 75, which ranges from a lower portion of the rear wall part 75 to an intermediate portion of the rear wall part 75 in an up/down direction, to the right side that is the outer side in the left/right direction. The intermediate wall part 77 extends forward from an extension leading end edge portion of the lateral extension wall part 76 in parallel with the rear wall part 75. The oblique wall part 78 extends obliquely from a front end edge portion of the intermediate wall part 77 toward the front side to be located at the left side that is the inner side in the left/right direction. A lowest liquid level indicator line 79 that indicates a lowest liquid level is formed horizontally on an outer surface of the intermediate wall part 77 to protrude outward. An indicator part 80 with the letters "MIN" indicating that a liquid level is the lowest liquid level is formed at a rear side of this lowest liquid level indicator line 79 to protrude outward.

As illustrated in FIG. 7, the sidewall 27 also has a rear oblique wall part 81, an intermediate wall part 82, a front oblique wall part 83, a front wall part 84, and a protrusion bottom part 85 illustrated in FIG. 4. The rear oblique wall part 81 extends obliquely from a front end edge portion of an upper end portion of the rear wall part 75 toward the front side to be located at the right side that is the outer side in the left/right direction. The intermediate wall part 82 illustrated in FIG. 7 extends forward from a front end edge portion of the rear oblique wall part 81 in parallel with the rear wall part 75. The front oblique wall part 83 extends obliquely from a front end edge portion of the intermediate wall part 82 toward the front side to be located at the left side that is the inner side in the left/right direction. The front wall part 84 extends forward from a front end edge portion of the front oblique wall part 83 in parallel with the intermediate wall part 82. The protrusion bottom part 85 illustrated in FIG. 4 extends horizontally rightward from an upper edge portion of the intermediate wall part 77 to connect lower end edge portions of the rear oblique wall part 81, the intermediate wall part 82, and the front oblique wall part 83 that are illustrated in FIG. 7.

As illustrated in FIG. 4, the intermediate front wall 29 extends upward from a front edge portion of the intermediate bottom part 23 in parallel with the rear end wall 28. The intermediate front wall 29 extends in the left/right direction to connect a front edge portion of the front wall part 69 of the sidewall 26 illustrated in FIG. 1 and a front edge portion of the oblique wall part 78 of the sidewall 27 illustrated in FIG. 4 together.

The front bottom part 30 extends horizontally forward from an upper edge portion of the intermediate front wall 29. The front bottom part 30 extends in the left/right direction to connect a front bottom portion of the front end wall part 70 of the sidewall 26 illustrated in FIG. 1 and a front bottom portion of the front wall part 84 of the sidewall 27 illustrated in FIG. 4 together.

The oblique wall 31 extends from a front edge portion of the front bottom part 30 to be inclined upward in the front thereof. The oblique wall 31 extends in the left/right direction to connect a front portion of the front end wall part 70 of the sidewall 26 illustrated in FIG. 1 and a front portion of the front wall part 84 of the sidewall 27 illustrated in FIG. 4 together.

The front end wall 32 extends vertically upward from a front edge portion of the oblique wall 31. The front end wall 32 extends in the left/right direction to connect a front end edge portion of the front end wall part 70 of the sidewall 26 illustrated in FIG. 1 and a front end edge portion of the front wall part 84 of the sidewall 27 illustrated in FIG. 4 together.

As illustrated in FIG. 7, the joined flange part 33 protrudes horizontally outward from overall circumferences of continuous upper edge portions of the sidewall 26, the sidewall 27, the rear end wall 28, and the front end wall 32, and is disposed within the same horizontal plane.

The reinforced plate part 34 illustrated in FIG. 1 is vertically formed at intermediate positions of the intermediate front wall 29 and the front bottom part 30 in the left/right direction to connect them. A front surface of the reinforced plate part 34 is inclined upward in the front thereof approximately at the same angle as the oblique wall 31.

The coupling plate part 35 is formed to connect the front downward protrusion part 24 and the rear downward protrusion part 25 in a posture in which it follows the front/rear direction. This coupling plate part 35 is formed with an insertion hole 91 into which a pin 90 for mounting on the master cylinder 12 is inserted. The coupling plate part 36 illustrated in FIG. 4 is disposed in parallel with the coupling plate part 35 in the left/right direction. The coupling plate part 36 connects the front downward protrusion part 24 and the rear downward protrusion part 25. The coupling plate part 36 is formed with an insertion hole 92 that is similar to that of the coupling plate part 35.

As illustrated in FIG. 7, a float guide wall 95, an inner wall 96, an inner wall 97, a partition wall 100, a rib 101, an extension wall 102, a passage forming wall 103, a passage forming wall 104, and a protrusion wall 105 are formed inside the lower structure 21.

The float guide wall 95 has an approximately cylindrical shape in a vertical direction. The float guide wall 95 is provided to stand at a position between the front and rear downward protrusion parts 24 and 25 of the intermediate bottom part 23. A float magnet 107 illustrated in FIG. 2 to check an insufficient amount of liquid inside is liftably inserted into this float guide wall 95. The level indicator switch 60 provided for the switch mounting part 61 detects that the float magnet 107 approaches and thus that an amount of liquid is equal to or smaller than a predetermined value. As illustrated in FIG. 7, the float guide wall 95 is formed with a cutout part 108 directed to an inner surface of the rear wall part 75 of the sidewall 27.

The inner wall 96 has a sidewall part 110 that is flush with an inner surface of the sidewall part 57 of the rear downward protrusion part 25 and is provided to stand at the intermediate bottom part 23, and a connecting wall part 111 that is provided to stand at the intermediate bottom part 23 to connect the float guide wall 95 and an end edge portion of the sidewall part 110 which is opposite to the rear end wall 28. The sidewall part 110 is parallel to the rear wall part 65 of the sidewall 26, and is disposed in a direction perpendicular to the rear end wall 28. The sidewall part 110 is formed such that a rear end thereof is disposed at a distance from the rear end wall 28 in the front/rear direction and a front end side thereof extends to the front side relative to an inner surface of the front wall part 55 of the rear downward protrusion part 25. The connecting wall part 111 is parallel to an inner surface of the rear end wall 28 and the front wall part 55 of the rear downward protrusion part 25.

The inner wall 97 has a sidewall part 112 that is flush with an inner surface of the sidewall part 58 of the rear downward protrusion part 25 and is provided to stand at the intermediate bottom part 23, and a connecting wall part 113 that is provided to stand at the intermediate bottom part 23 to connect the float guide wall 95 and an end edge portion of the sidewall part 112 which is opposite to the rear end wall 28. The sidewall part 112 is parallel to the rear wall part 75 of the sidewall 27, and is disposed in a direction perpendicular to the rear end wall 28. The sidewall part 112 is spaced apart from the rear end wall 28 in the front/rear direction, and is formed up to an opposite side facing the rear end wall 28 relative to the inner surface of the front wall part 55 of the rear downward protrusion part 25. The connecting wall part 113 is parallel to the inner surface of the rear end wall 28 and the front wall part 55 of the rear downward protrusion part 25.

The partition wall 100 is provided to stand at the intermediate bottom part 23 to connect the float guide wall 95 and an end edge portion thereof opposite to the rear end wall 28 of the rear wall part 75 of the sidewall 27. The partition wall 100 is disposed at a front side of the connecting wall part 113, and is parallel to the connecting wall part 113. The aforementioned cutout part 108 of the float guide wall 95 is disposed between the partition wall 100 and the connecting wall part 113. The rib 101 connects the rear wall part 65 of the sidewall 26 and the float guide wall 95 to extend vertically upward from the intermediate bottom part 23. The rib 101 is disposed on the same plane as the partition wall 100.

The extension wall 102 is provided to stand at the intermediate bottom part 23 and the front placement bottom part 38 of the front downward protrusion part 24 to extend forward from a position of a front portion of the float guide wall 95 wherein this position is directed toward the sidewall 26, and is also connected to the rear wall part 51 of the front downward protrusion part 24. The extension wall 102 is made up of a base end wall part 115 that extends from the float guide wall 95 to be parallel to the intermediate wall part 67 of the sidewall 26, and a leading end wall part 116 that extends from an opposite side of the base end wall part 115 which is opposite to the float guide wall 95 to be parallel to the front oblique wall part 68 of the sidewall 26. The leading end wall part 116 is spaced apart from the front wall part 50 of the front downward protrusion part 24 in the front/rear direction.

The passage forming wall 103 is provided to stand at the intermediate bottom part 23 at a front side of the front downward protrusion part 24 and at a side of the sidewall 27. The passage forming wall 103 has a base end wall part 118, an intermediate oblique wall part 119, and a leading end wall part 120. The base end wall part 118 extends from the front wall part 69 of the sidewall 26 to be flush with an inner surface of the front wall part 50 of the front downward protrusion part 24. The intermediate oblique wall part 119 extends from an end edge portion of the base end wall part 118 which is opposite to the sidewall 26 to be parallel to the front oblique wall part 83 of the sidewall 27. The leading end wall part 120 extends from an end edge portion of the intermediate oblique wall part 119 which is opposite to the base end wall part 118 to be flush with an inner surface of the sidewall part 52 of the front downward protrusion part 24.

The leading end wall part 120 is spaced apart from the partition wall 100 in the front/rear direction.

The passage forming wall 104 is provided to stand at the front bottom part 30 and the protrusion bottom part 85 at a front side of the passage forming wall 103 and at the side of the sidewall 27. The passage forming wall 104 has a base end wall part 123, an intermediate oblique wall part 124, and a leading end wall part 125. The base end wall part 123 extends from an end portion directed toward the front end wall part 70 of the front wall part 69 of the sidewall 26 to be flush with an inner surface of the intermediate front wall 29. The intermediate oblique wall part 124 extends from an end edge portion of the base end wall part 123 which is opposite to the sidewall 26 to be parallel to the front oblique wall part 83 of the sidewall 27. The leading end wall part 125 extends from an end edge portion of the intermediate oblique wall part 124 which is opposite to the base end wall part 123 to be flush with an inner surface of the intermediate wall part 77 of the sidewall 27. An end portion of the leading end wall part 120 which is directed toward the rear end wall 28 is disposed closer to the rear end wall 28 than an end portion of the leading end wall part 125 which is directed toward the rear end wall 28.

The protrusion wall 105 is provided to stand at the protrusion bottom part 85 to be flush with the intermediate wall part 77 of the sidewall 27. The protrusion wall 105 extends from an inner surface of the rear oblique wall part 81 of the sidewall 27 to be flush with the leading end wall part 125. The protrusion wall 105 is spaced apart from the leading end wall part 125 in the front/rear direction.

All of the float guide wall 95, the inner wall 96, the inner wall 97, the partition wall 100, the extension wall 102, the passage forming wall 103, the passage forming wall 104, and the protrusion wall 105 have upper surfaces disposed on the same plane as an upper surface of the joined flange part 33. The rib 101 has an upper surface lower than these.

As illustrated in FIG. 4, the upper structure 20 has a roof part 130, an upward protrusion part 131 that protrudes upward in the front of the roof part 130, and an inlet 132 that protrudes from the upward protrusion part 131 to be inclined upward in the front thereof. The upper structure 20 also has a sidewall 133 illustrated in FIG. 1, a sidewall 134 illustrated in FIG. 4, a rear end wall 135, a front end wall 136, and a joined flange part 137 of a lower end thereof. The sidewall 133 is formed to extend downward from left-hand edge portions of the roof part 130 and the upward protrusion part 131. The sidewall 134 is formed to extend downward from right-hand edge portions of the roof part 130 and the upward protrusion part 131. The rear end wall 135 is formed to protrude downward from a rear edge portion of the roof part 130. The front end wall 136 is formed to extend downward from a front end portion of the upward protrusion part 131. The upper structure 20 is also mounted in a vehicle in a posture in which the rear end wall 135 and the front end wall 136 are orthogonal to the front/rear direction of the vehicle.

As illustrated in FIG. 1, the upward protrusion part 131 has a front wall part 140 that extends upward from the front end wall 136 to be flush with the front end wall 136, a sidewall part 141 that extends upward from a front portion of the sidewall 133 to be flush with the sidewall 133, a sidewall part 142 that extends upward from a front portion of the sidewall 134 illustrated in FIG. 4 to be flush with the sidewall 134, and a rear wall part 143 that extends upward from a front edge portion of the roof part 130. The upward protrusion part 131 also has an oblique part 144 that connects upper edge portions of the front wall part 140, the sidewall part 141, and the sidewall part 142 and is inclined downward in the front thereof, and a horizontal upper plate part 145 that connects upper edge portions of the rear wall part 143, the sidewall part 141, and the sidewall part 142.

The inlet 132 has a tubular shape, extends vertically from the oblique part 144, and thus extends to be inclined upward in the front thereof. As illustrated in FIG. 2, an inner circumferential portion of the inlet 132 becomes an injection path 148. This injection path 148 passes through the inside and outside of the reservoir body 18. A highest liquid level indicator line 149 indicating a highest liquid level is formed horizontally on an outer surface of the sidewall part 141 illustrated in FIG. 1 to protrude outward. An indicator part 150 with the letters "MAX" indicating that a liquid level is the highest liquid level is formed above this highest liquid level indicator line 149 to protrude outward. A highest liquid level indicator line 151 indicating the highest liquid level is also formed horizontally on an outer surface of the sidewall part 142 illustrated in FIG. 4 to protrude outward. An indicator part 152 with the letters "MAX" indicating that the liquid level is the highest liquid level is formed above this highest liquid level indicator line 151 to protrude outward. The highest liquid level indicator lines 149 and 151 are formed at a higher position than the roof part 130.

Figure 3:
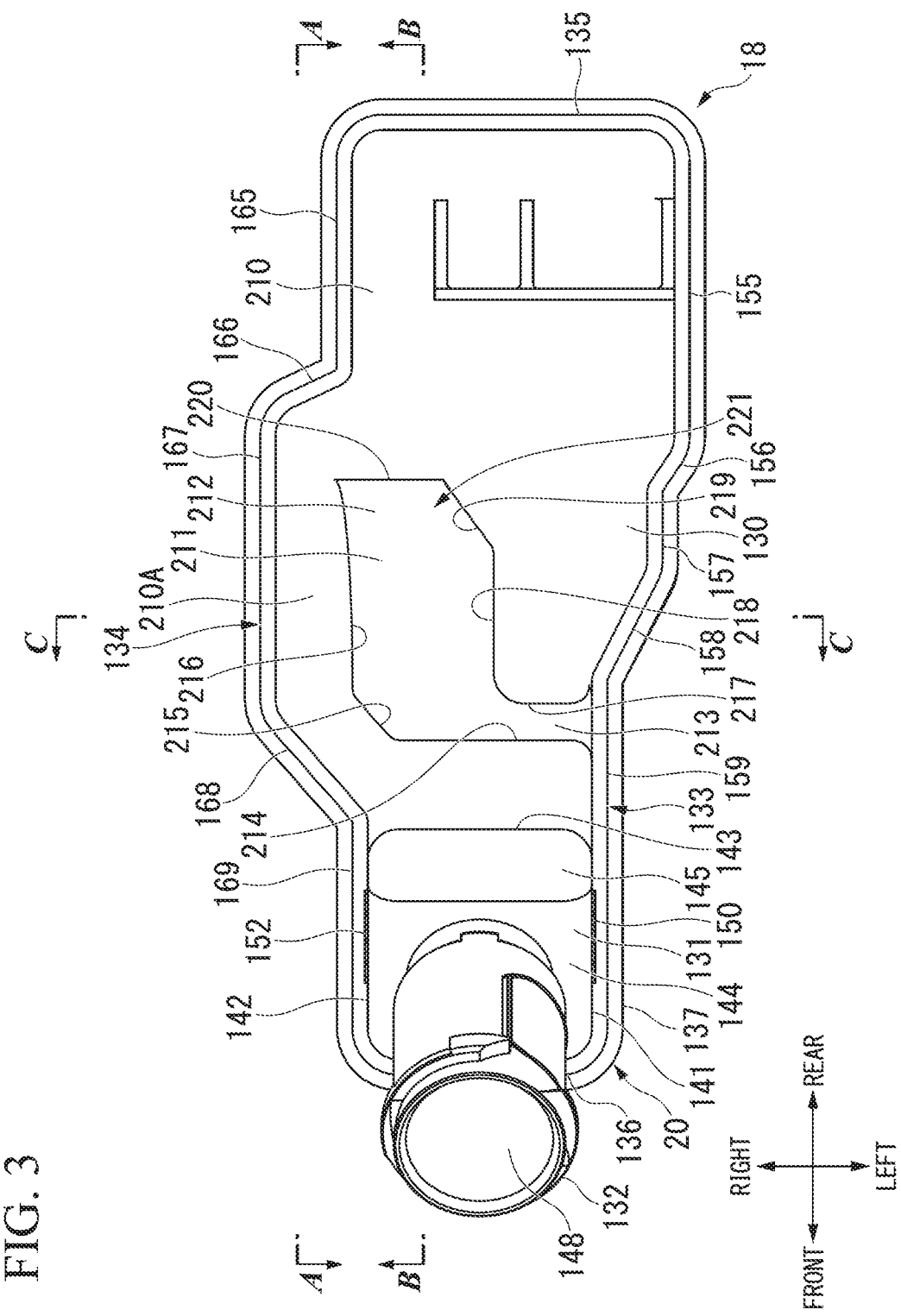
FIG. 3 is a top view illustrating a reservoir body of the reservoir of the first embodiment.

As illustrated in FIGS. 1 and 3, the sidewall 133 has a rear wall part 155, a rear oblique wall part 156, an intermediate wall part 157, a front oblique wall part 158, and a front wall part 159. The rear wall part 155 extends vertically forward from a left-hand end edge portion of the rear end wall 135 in the front/rear direction. The rear oblique wall part 156 extends obliquely from a front end edge portion of the rear wall part 155 toward the front side to be located at the right side that is the inner side in the left/right direction. The intermediate wall part 157 extends forward from a front end edge portion of the rear oblique wall part 156 to be parallel to the rear wall part 155. The front oblique wall part 158 extends obliquely from a front end edge portion of the intermediate wall part 157 toward the front side to be located at the right side. The front wall part 159 extends forward from a front end edge portion of the front oblique wall part 158 to be parallel to the intermediate wall part 157.

As illustrated in FIG. 3, the sidewall 134 has a rear wall part 165, a rear oblique wall part 166, an intermediate wall part 167, a front oblique wall part 168, and a front wall part 169. The rear wall part 165 extends vertically forward in a right-hand end edge portion of the rear end wall 135 in the front/rear direction. The rear oblique wall part 166 extends obliquely from a front end edge portion of the rear wall part 165 toward the front side to be located at the right side that is the outer side in the left/right direction. The intermediate wall part 167 extends forward from a front end edge portion of the rear oblique wall part 166 to be parallel to the rear wall part 165. The front oblique wall part 168 extends obliquely from a front end edge portion of the intermediate wall part 167 toward the front side to be located at the left side that is the inner side in the left/right direction. The front wall part 169 extends forward from a front end edge portion of the front oblique wall part 168 to be parallel to the intermediate wall part 167.

The joined flange part 137 protrudes horizontally outward from overall circumferences of continuous lower edge portions of the sidewall 133, the sidewall 134, the rear end wall 135, and the front end wall 136, and is disposed within the same horizontal plane.

Figure 8:
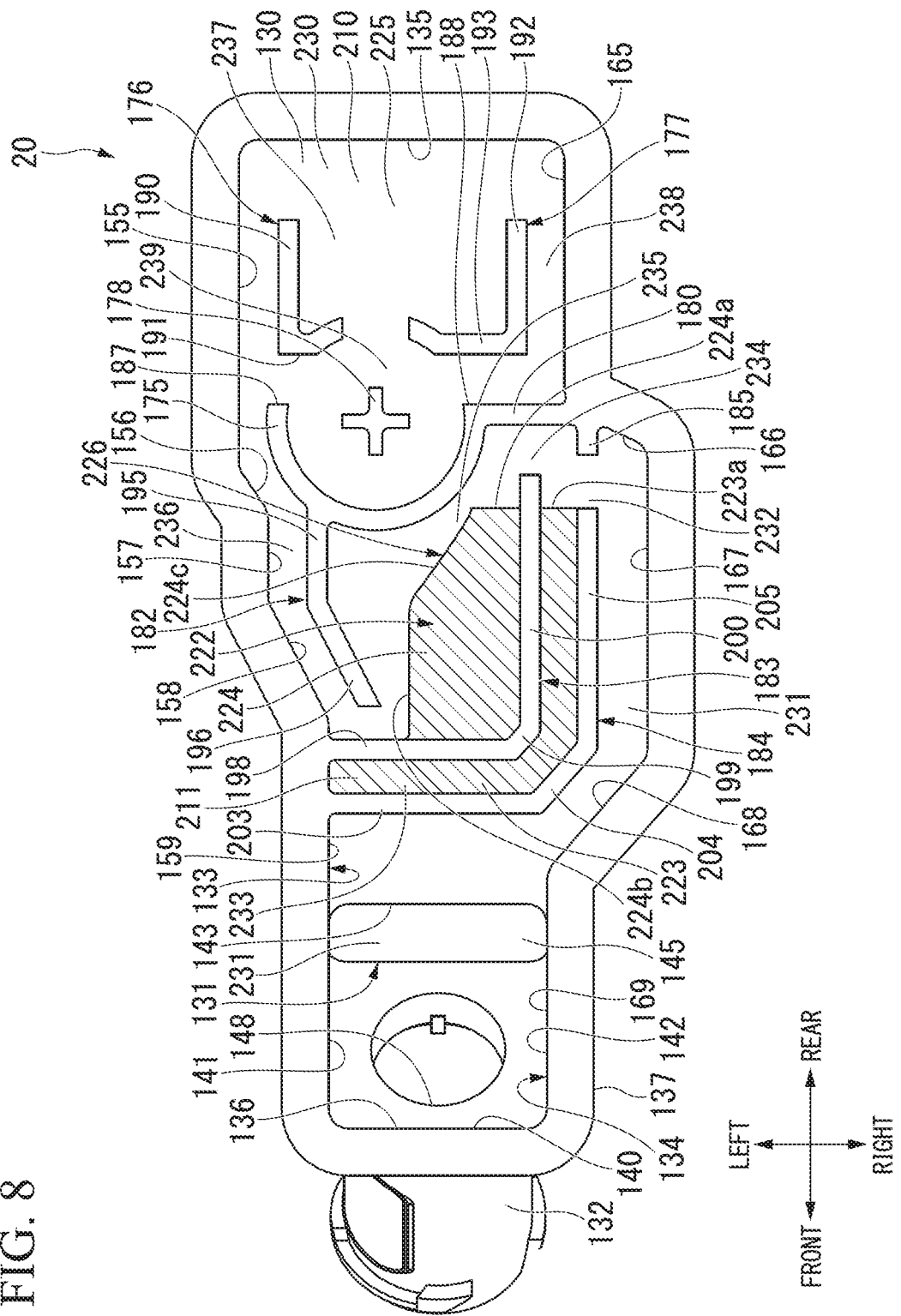
FIG. 8 is a bottom view illustrating an upper structure of the reservoir of the first embodiment.

As illustrated in FIG. 8, a float guide wall 175, an inner wall 176, an inner wall 177, a protrusion wall 178, a partition wall 180, an extension wall 182, a passage forming wall 183, a passage forming wall 184, and a protrusion wall 185 are formed inside the upper structure 20.

The float guide wall 175 has an approximately cylindrical shape in a vertical direction. The float guide wall 175 is provided to stand on an inner surface of the roof part 130. The float guide wall 175 is formed with a cutout part 187 at a side of the sidewall 133 as well as a cutout part 188 at a side of the sidewall 134. The protrusion wall 178 has a crisscross shape and is provided to stand on the inner surface of the roof part 130. The protrusion wall 178 is disposed at a central position of the float guide wall 175.

The inner wall 176 has a sidewall part 190 that is parallel to the rear wall part 155 of the sidewall 133 and is provided to stand on the inner surface of the roof part 130, and a connecting wall part 191 that is provided to stand on the inner surface of the roof part 130 to connect the float guide wall 175 and an end edge portion of the sidewall part 190 which is opposite to the rear end wall 135. The sidewall part 190 follows a direction perpendicular to the rear end wall 135, and is spaced apart from the rear end wall 135 in the front/rear direction. The connecting wall part 191 is parallel to the rear end wall 135. The cutout part 187 of the float guide wall 175 is disposed at an opposite side of the connecting wall part 191 which is opposite to the rear end wall 135.

The inner wall 177 has a sidewall part 192 that is parallel to the rear wall part 165 of the sidewall 134 and is provided to stand on the inner surface of the roof part 130, and a connecting wall part 193 that is provided to stand on the inner surface of the roof part 130 to connect the float guide wall 175 and an end edge portion of the sidewall part 192 which is opposite to the rear end wall 135. The sidewall part 192 follows a direction perpendicular to the rear end wall 135, and is spaced apart from the rear end wall 135 in the front/rear direction. The connecting wall part 193 is parallel to the rear end wall 135.

The partition wall 180 is provided to stand on the inner surface of the roof part 130 to connect the float guide wall 175 and an end edge portion of the rear wall part 165 of the sidewall 134 which is opposite to the rear end wall 135. The partition wall 180 is disposed at a front side of the connecting wall part 193, and is parallel to the connecting wall part 193. The cutout part 188 of the float guide wall 175 is disposed between the partition wall 180 and the connecting wall part 193.

The extension wall 182 is provided to stand on the inner surface of the roof part 130 to extend forward from a position of a front portion of the float guide wall 175 wherein this position is directed toward the sidewall 133. The extension wall 182 is made up of a base end wall part 195 that extends from the float guide wall 175 and is parallel to the intermediate wall part 157 of the sidewall 133, and a leading end wall part 196 that extends from an opposite side of the base end wall part 195 which is opposite to the float guide wall 175 to be parallel to the front oblique wall part 158 of the sidewall 133.

The passage forming wall 183 is provided to stand on the inner surface of the roof part 130, and has a base end wall part 198, an intermediate oblique wall part 199, and a leading end wall part 200. The base end wall part 198 extends from an end portion of the front wall part 159 which is opposite to the front end wall 136 to be parallel to the front end wall 136. The intermediate oblique wall part 199 extends from an end edge portion of the base end wall part 198 which is opposite to the sidewall 133 to be parallel to the front oblique wall part 168 of the sidewall 134. The leading end wall part 200 extends from an end edge portion of the intermediate oblique wall part 199 which is opposite to the base end wall part 198 to be parallel to the intermediate wall part 167 of the sidewall 134. The leading end wall part 200 is spaced apart from the partition wall 180 in the front/rear direction.

The passage forming wall 184 is provided to stand on the inner surface of the roof part 130, and has a base end wall part 203, an intermediate oblique wall part 204, and a leading end wall part 205. The base end wall part 203 is located at the base end wall part 198 directed toward the front end wall 136, and extends from the front wall part 159 of the sidewall 133 in parallel with the front end wall 136. The intermediate oblique wall part 204 extends from an end edge portion of the base end wall part 203 which is opposite to the sidewall 133 to be parallel to the front oblique wall part 168 of the sidewall 134. The leading end wall part 205 extends from an end edge portion of the intermediate oblique wall part 204 which is opposite to the base end wall part 203 to be parallel to the intermediate wall part 167 of the sidewall 134. An end portion of the aforementioned leading end wall part 200 which is directed toward the rear end wall 135 is disposed closer to the rear end wall 135 than an end portion of the leading end wall part 205 which is directed toward the rear end wall 135.

The protrusion wall 185 is provided to stand on the inner surface of the roof part 130 to follow the intermediate wall part 167 of the sidewall 134. The protrusion wall 185 extends from an inner surface of the rear oblique wall part 166 of the sidewall 134 to be flush with the leading end wall part 205. The protrusion wall 185 is spaced apart from the leading end wall part 205 in the front/rear direction.

All of the float guide wall 175, the inner wall 176, the inner wall 177, the partition wall 180, the extension wall 182, the passage forming wall 183, the passage forming wall 184, and the protrusion wall 185 have lower surfaces disposed on the same plane as a lower surface of the joined flange part 137.

Figure 5:
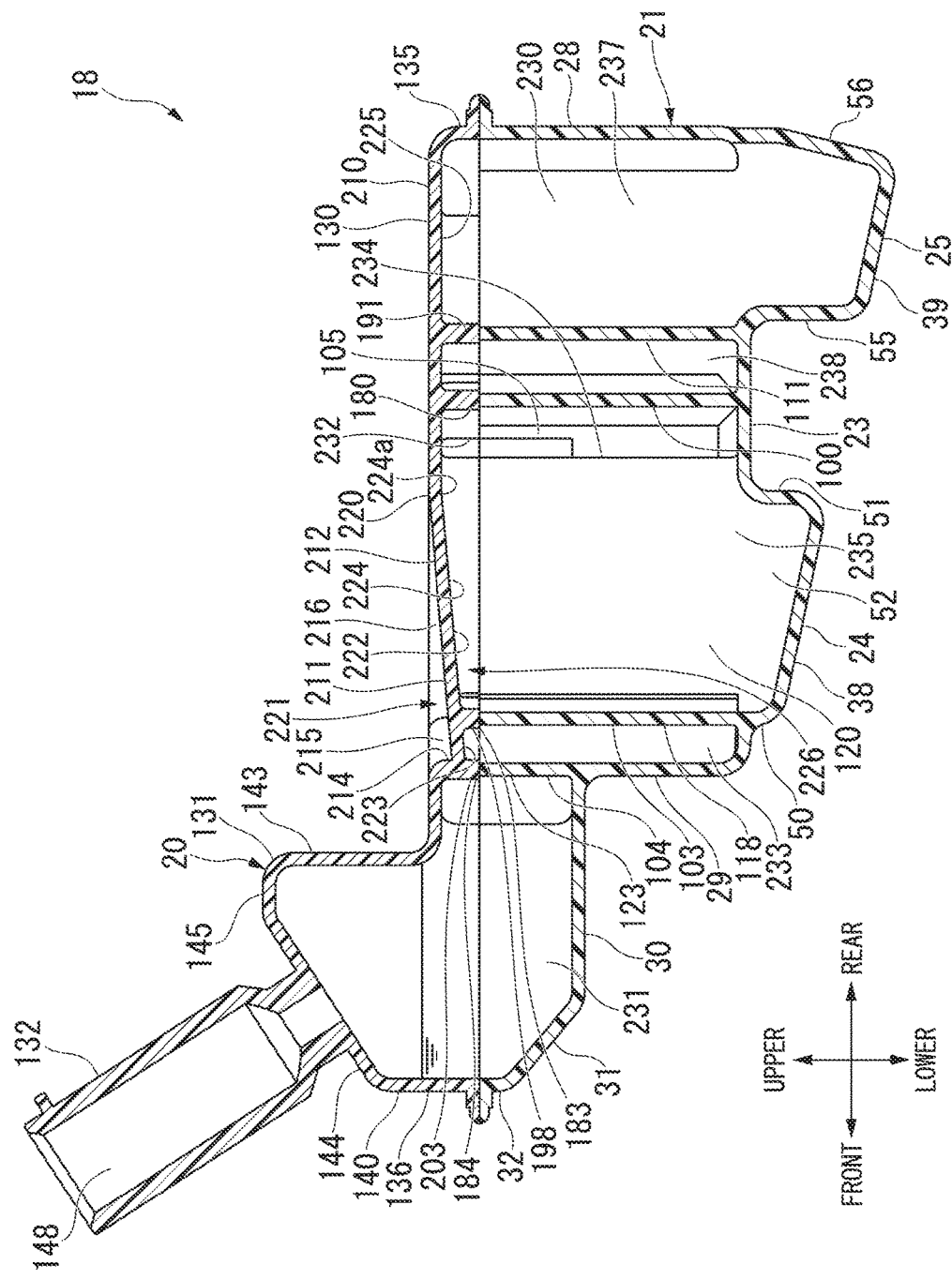
FIG. 5 is a sectional view of cross section B-B of FIG. 3.

As illustrated in FIG. 5, the roof part 130 has a main plate part 210 that is disposed horizontally, and an oblique plate part 211 that is disposed to be inclined with respect to the horizontal. As illustrated in FIG. 3, the oblique plate part 211 has a plate part 212 that has an approximately rectangular shape, is long in the front/rear direction, and has a wide area, and a plate part 213 that has an approximately rectangular shape, is short in the front/rear direction, and has a narrow area. The plate part 212 and the plate part 213 are disposed on the same plane. The oblique plate part 211 has an L shape in a top view. The oblique plate part 211 is formed within a range from the intermediate wall part 167 to the front oblique wall part 168 in the front/rear direction, is separated from the sidewall 134 as a whole, and has a shape in which a part thereof is beyond the side of the sidewall 133 at the plate part 213.

Figure 6:
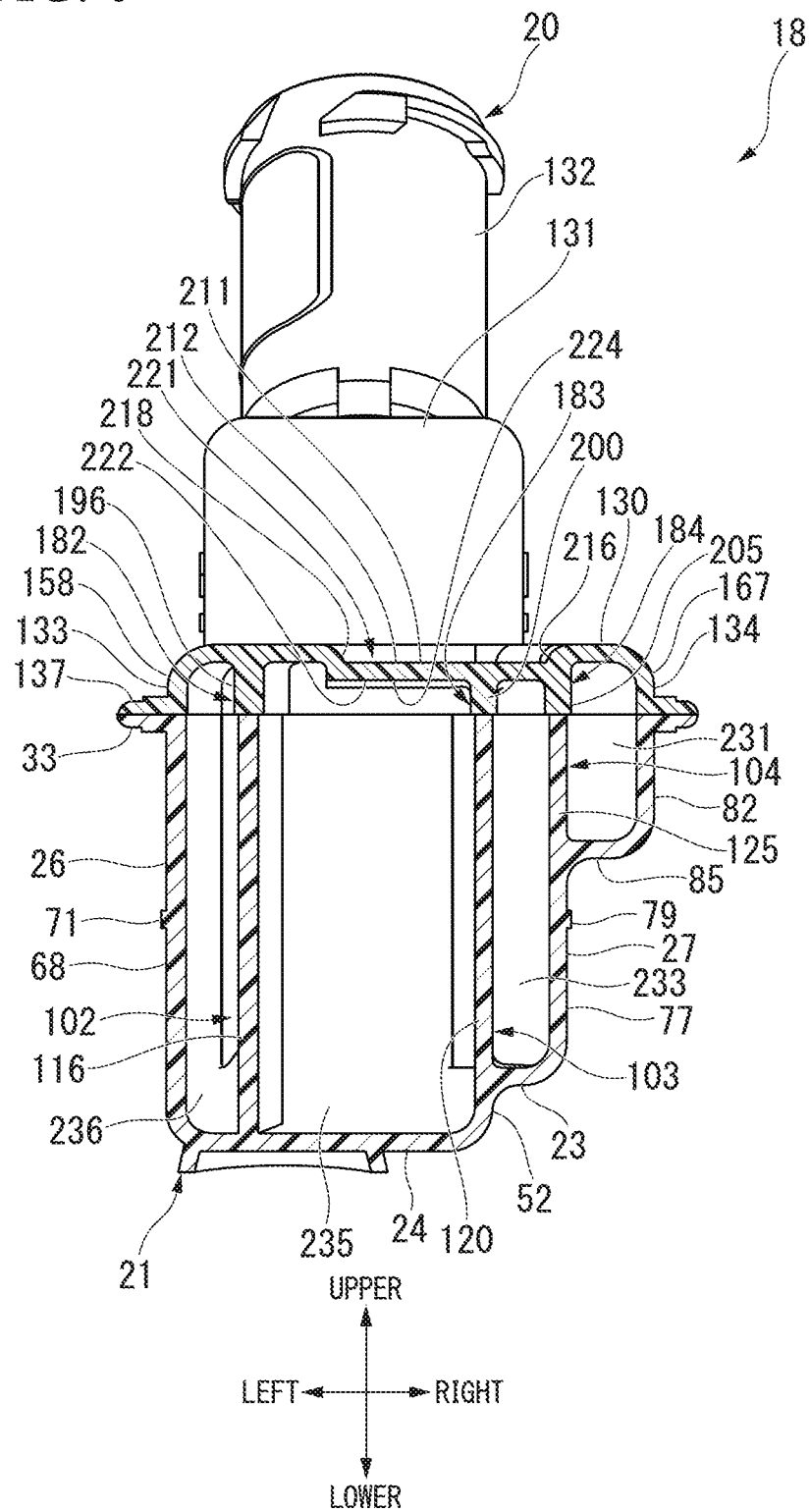
FIG. 6 is a sectional view of cross section C-C of FIG. 3.

As illustrated in FIG. 5, the oblique plate part 211 is formed from a position of the passage forming wall 184 past the passage forming wall 183 to a position adjacent to the partition wall 180. The oblique plate part 211 is inclined such that a height position of a portion connected to the base end wall part 203 of the passage forming wall 184 is lowest and a height position gets higher from the base end wall part 203 toward the rear end wall 135. As illustrated in FIG. 6, the oblique plate part 211 is inclined such that the height position is constant at the same position in the front/rear direction regardless of a left/right position. Also, as illustrated in FIG. 5, an end portion of the oblique plate part 211 which is directed toward the rear end wall 135 is identical in height position to the main plate part 210.

The roof part 130 has standing wall parts 214 to 219 that rise upward from an edge portion of the oblique plate part 211 to be connected to the main plate part 210 and are illustrated in FIG. 3. The standing wall part 214 is a portion that rises from front edge portions of the plate parts 212 and 213, is parallel to the front end wall 136, and is beyond the side of the sidewall 133. The standing wall part 215 is a portion that rises from a front portion of the plate part 212 which is directed toward the sidewall 134, and is parallel to the front oblique wall part 168. The standing wall part 216 is a portion that rises from an intermediate portion and a rear portion of the plate part 212 which is directed toward the sidewall 134 in the front/rear direction, and follows the intermediate wall part 167. The standing wall part 216 is slightly bent to reduce a distance from the intermediate wall part 167 toward the rear side. The standing wall part 217 is a portion that rises from a rear edge portion of the plate part 213, is parallel to the standing wall part 214, and is beyond the side of the sidewall 133. The standing wall part 218 is a portion that rises from the intermediate portion of the plate part 212 which is directed toward the sidewall 133 in the front/rear direction, and is parallel to the intermediate wall part 157. The standing wall part 219 is a portion that rises from the rear portion of the plate part 212 which is directed toward the sidewall 133, and is approximately parallel to the standing wall part 215.

In the roof part 130, a rear edge portion of the plate part 212 is connected to the main plate part 210 to form a boundary part 220 with the main plate part 210. This boundary part 220 is parallel to the standing wall part 214. As illustrated in FIG. 5, the roof part 130 is formed with a concave part 221, which is recessed downward relative to the main plate part 210, by the oblique plate part 211 and the standing wall parts 214 to 219. Also, when a portion of the main plate part 210 which corresponds to a communication path 231 (to be described below) is set as a communication path roof plate part 210A, the concave part 221 is formed to be recessed downward relative to the communication path roof plate part 210A. In this way, the concave part 221 is formed to make a surface part 222 (to be described below). Thereby, it is possible to recognize that the surface part 222 is formed by viewing the exterior of the upper structure 20, and manufacturing efficiency of the reservoir 18 is improved. Also, when the upper structure 20 is formed, it is possible to form the oblique plate part 211 at a fixed thickness and suppress deformation caused by heat sink or the like, and manufacturing accuracy of the reservoir is improved.

Hatching shown in FIG. 8 indicates the surface part 222 inside the oblique plate part 211. That is, as illustrated in FIG. 5, this surface part 222 is a leading end face of a protrusion side of a convex part 226 that is formed at a lower surface side of the roof part 130 to protrude downward as the concave part 221 is formed at an upper surface side of the roof part 130. Similar to the oblique plate part 211, this surface part 222 is disposed on the same plane, and is inclined such that a height position of a portion connected to the base end wall part 203 of the passage forming wall 184 is the lowest and a height position gets higher from the base end wall part 203 toward the rear end wall 135. As illustrated in FIG. 6, the surface part 222 is inclined such that the height position is constant at the same position in the front/rear direction regardless of a position in the left/right direction. Also, as illustrated in FIG. 5, an end portion of the surface part 222 which is directed toward the rear end wall 135 is identical in height position to a horizontal main ceiling surface 225 that is an inner surface of the main plate part 210. The surface part 222 is configured to form the concave part 221 in which the oblique plate part 211 is recessed downward relative to the main plate part 210, but the surface part 222 may be formed using the roof part 130 as a plane without forming the concave part 221.

As illustrated in FIG. 8, the surface part 222 is made up of an L-shaped surface 223 that is disposed between the passage forming wall 183 and the passage forming wall 184, and an approximately pentagonal surface 224 that is disposed at an opposite side of the passage forming wall 183 which is opposite to the passage forming wall 184. The surface 223 is formed within an entire range between the base end wall parts 198 and 203, an entire range between the intermediate oblique wall parts 199 and 204, and an entire range of a portion overlapping the leading end wall part 205 in the front/rear direction within an entire range between the leading end wall parts 200 and 205. An end edge portion 223a of the surface 223 which is directed toward the rear end wall 135 is a portion that appears as the boundary part 220 of the oblique plate part 211 illustrated in FIG. 3 is formed, and is parallel to the rear end wall 135.

As illustrated in FIG. 8, the surface 224 extends from the base end wall part 198 to an opposite side facing the base end wall part 203, and extends from the leading end wall part 200 to an opposite side facing the leading end wall part 205. An end edge portion 224a of the surface 224 which is directed toward the rear end wall 135 is formed in parallel with the rear end wall 135. A position of the surface 224 in the front/rear direction is identical to that of the end edge portion 223a. Similar to the end edge portion 223a, the end edge portion 224a appears as the boundary part 220 of the oblique plate part 211 illustrated in FIG. 3 is formed.

As illustrated in FIG. 8, an end edge portion 224b of the surface 224 which is directed toward the sidewall 133 is parallel to the leading end wall part 200 at a side of the leading end wall part 200 rather than the extension wall 182. The end edge portion 224b is a portion that appears as the standing wall part 218 illustrated in FIG. 3 is formed. Also, as illustrated in FIG. 8, the surface 224 is inclined such that an end edge portion 224c thereof between the end edge portions 224a and 224b thereof intersects both of the end edge portions 224a and 224b at an obtuse angle. The end edge portion 224c is a portion that appears as the standing wall part 219 illustrated in FIG. 3 is formed. The end edge portions 224a, 224b and 224c do not overlap the float guide wall 175, the extension wall 182, the partition wall 180, and the protrusion wall 185.

The joined flange part 33 of the lower structure 21 illustrated in FIG. 7 and the joined flange part 137 of the upper structure 20 illustrated in FIG. 8 are joined by, for instance, welding, so that the reservoir body 18 is formed. At this point, the rear end walls 28 and 135, the front end walls 32 and 136, the rear wall parts 65 and 155, the rear oblique wall parts 66 and 156, the intermediate wall parts 67 and 157, and the front oblique wall parts 68 and 158 are each joined over full lengths by superposition at horizontal positions. Also, the front wall part 69 and the front end wall part 70 are joined with the front wall part 159 by superposing horizontal positions over full lengths. In addition, the rear wall parts 75 and 165, the rear oblique wall parts 81 and 166, the intermediate wall parts 82 and 167, the front oblique wall parts 83 and 168, and the front wall parts 84 and 169 are each joined by superposing horizontal positions over full lengths.

Also, the float guide walls 95 and 175, the sidewall parts 110 and 190, the connecting wall parts 111 and 191, the sidewall parts 112 and 192, the connecting wall parts 113 and 193, the partition walls 100 and 180, and the base end wall parts 115 and 195 are each joined by superposing horizontal positions over full lengths. In addition, the leading end wall parts 116 and 196, the base end wall parts 118 and 198, the intermediate oblique wall parts 119 and 199, the leading end wall parts 120 and 200, the base end wall parts 123 and 203, the intermediate oblique wall parts 124 and 204, and the leading end wall parts 125 and 205 are each joined by superposing horizontal positions over full lengths. Also, the protrusion walls 105 and 185 are each joined by superposing horizontal positions over full lengths to match front end positions with each other.

In the reservoir body 18, a portion surrounded with the passage forming walls 104 and 184, the protrusion walls 105 and 185, the front wall parts 69 and 159, the front oblique wall parts 68 and 158, the intermediate wall parts 67 and 157, the rear oblique wall parts 66 and 156, the rear wall parts 65 and 155, the rear end walls 28 and 135, and the rear wall parts 75 and 165 becomes a reservoir chamber 230 in which a liquid is stored. Also, a portion surrounded with the front end walls 32 and 136, the front wall parts 84 and 169, the front end wall part 70 and the front wall part 159, the front wall parts 69 and 159, the front oblique wall parts 83 and 168, the intermediate wall parts 82 and 167, the rear oblique wall parts 81 and 166, the passage forming walls 104 and 184, and the protrusion walls 105 and 185 constitutes a communication path 231 that extends from the inlet 132, which is provided to inject the liquid from the outside into the reservoir chamber 230 and is located at a vehicle front side, toward a vehicle rear side. The reservoir chamber 230 communicates with the secondary fluid pressure chamber of the master cylinder 12 via the communication hole 44, and stores the liquid to be supplied to the secondary fluid pressure chamber of the master cylinder 12.

A lower end of the communication path 231 is defined by an inner surface directed to an upper side of the front bottom part 30 and an inner surface directed to an upper side of the protrusion bottom part 85 in which a height position is aligned with this inner surface. Thus, a communication opening 232 that enables communication between the communication path 231 and the reservoir chamber 230 is formed between the passage forming walls 104 and 184 and between the protrusion walls 105 and 185. As illustrated in FIG. 4, the communication opening 232 has an upper end portion formed on an inner surface directed to a lower side of the main plate part 210 of the roof part 130, and a lower end portion formed on an inner surface directed to the upper side of the protrusion bottom part 85. As illustrated in FIG. 5, the aforementioned surface part 222 of the roof part 130 becoming an upper portion of the reservoir chamber 230 is inclined to get higher from the vehicle front side toward the communication opening 232 of the vehicle rear side in a state in which the reservoir chamber is mounted in a vehicle.

A liquid that is injected from the inlet 132 illustrated in FIG. 8 and is introduced from the communication opening 232 into the reservoir chamber 230 through the communication path 231 is introduced into a passage 233 between the passage forming walls 103 and 183 and between the passage forming walls 104 and 184 illustrated in FIGS. 7 and 8, a lower end portion of which is formed on an inner surface of the intermediate bottom part 23 lower than the communication opening 232. At the same time, the liquid is introduced into a chamber 235 including the inside of the front downward protrusion part 24 via an intermediate opening 234 between the passage forming walls 103 and 183 and between the partition walls 100 and 180. Here, the chamber 235 is also a reservoir chamber in which a liquid is stored, and communicates with the primary fluid pressure chamber of the master cylinder, but is referred to simply as a "chamber" for the sake of description. As illustrated in FIG.

4, the intermediate opening 234 has an upper end portion formed on the inner surface directed to the lower side of the main plate part 210 of the roof part 130, and a lower end portion formed on an inner surface (not illustrated) directed to an upper side of the intermediate bottom part 23. As illustrated in FIGS. 7 and 8, the intermediate opening 234 is provided to be offset to a rear side relative to the communication opening 232. When a portion inside the front downward protrusion part 24 of this chamber 235 is filled with a liquid, the liquid is introduced into a chamber 237 including the inside of the rear downward protrusion part 25 via a passage 236 between the front oblique wall parts 68 and 158, the intermediate wall parts 67 and 157, the rear oblique wall parts 66 and 156, the rear wall parts 65 and 155, the extension walls 102 and 182, the float guide walls 95 and 175, and the inner walls 96 and 176, a lower end portion of which is formed on the inner surface of the intermediate bottom part 23. When a portion inside the rear downward protrusion part 25 of this chamber 237 is filled with the liquid, the liquid is introduced into a chamber 239 inside the float guide walls 95 and 175 via the cutout part 108 through a passage 238 between the rear wall parts 75 and 165, the partition walls 100 and 180, and the inner walls 97 and 177, a lower end portion of which is formed on the inner surface of the intermediate bottom part 23.

Since the passage 233 is formed at the front side relative to the communication opening 232 and since the chamber 235 is formed at the front side relative to the intermediate opening 234, although the liquid moves forward in the reservoir chamber 230 during braking, an amount of the liquid led out into the communication path 231 can be controlled.

That is, if the amount of the liquid led out into the communication path 231 is much, the liquid may exude from a gap between the cap 19 and the reservoir body 18, but this state can be inhibited.

In the reservoir described in Patent Literature 1 above, although an allowable maximum amount of liquid is injected, a gap is formed between the roof part of the reservoir and the liquid level. In contrast, in the reservoir 11 of the present embodiment, if the liquid is injected until the liquid level matches the allowable highest liquid level indicator line 149 to increase storage efficiency of the liquid, the liquid comes into contact with the roof part 130. In this case, if the liquid is injected from the inlet 132 until the liquid level matches the highest liquid level indicator line 149, when the ceiling surface of the roof part 130 is flat, if the ceiling surface is inclined upward in the front thereof even a slight amount by, for instance, mounting tolerance, air may accumulate in the passage 233 and the chamber 235 that are located at the front side relative to the communication opening 232 of the reservoir chamber 230. That is, the liquid may not be satisfactorily injected into the reservoir chamber.

In contrast, in the reservoir 11 of the present embodiment, as indicated in FIG. 8 by the hatching, the surface part 222 provided at the upper portion of the reservoir chamber 230 is inclined to get higher from the vehicle front side toward the communication opening 232 of the vehicle rear side in the state in which the reservoir chamber is mounted in the vehicle. For this reason, during the injection of the liquid, the air in the reservoir chamber 230 can be satisfactorily discharged from the communication opening 232, and an amount of the air accumulated in the passage 233 and the chamber 235 that are located at the front side relative to the communication opening 232 of the reservoir chamber 230 can be reduced. That is, it is possible to satisfactorily inject the liquid into the reservoir chamber 230 and to store more liquid in the reservoir chamber 230. Therefore, it is possible to further increase storage efficiency of the liquid to make the reservoir more compact. Also, since the amount of the air accumulated in the reservoir chamber 230 can be reduced, an appearance of the reservoir chamber 230 when it stores a liquid is improved.

In the first embodiment, the oblique surface part 211 is formed at the upper structure 20, thereby constituting the surface part 222. That is, the surface part 222 is integrally molded at the upper structure 20, but the present invention is not limited thereto. The surface part 222 may be configured by using the oblique surface part 211 as an oblique surface member independently of the upper structure 20 and the lower structure 21 and sandwiching the oblique surface member between the upper structure 20 and the lower structure 21 of the reservoir 18.

Second Embodiment

Figure 9:
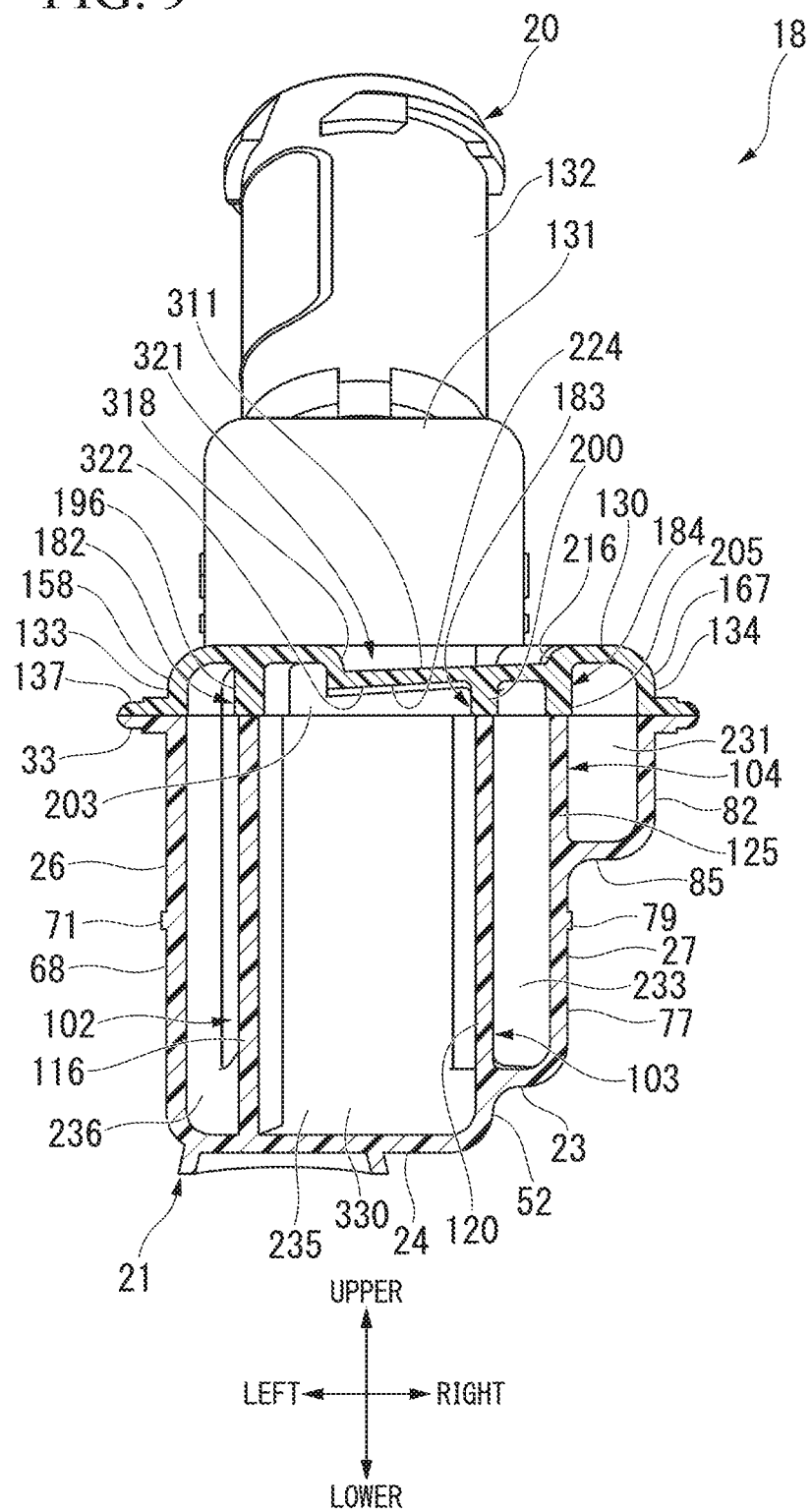
FIG. 9 is a sectional view equivalent to cross section C-C of FIG. 3 in a reservoir of a second embodiment.

Next, a second embodiment will be described on the basis of FIG. 9. FIG. 9 is a sectional view equivalent to cross section C-C of FIG. 3. In the first embodiment, the surface part 222 is obliquely formed such that the height position is constant at the same position in the front/rear direction regardless of the position in the left/right direction. In the second embodiment, a surface part 322 corresponding to the surface part 222 is obliquely formed in the front/rear direction as well as the left/right direction.

In detail, as illustrated in FIG. 9, a height position of an oblique plate part 311 (corresponding to the oblique plate part 211) in the front/rear direction of the vehicle is the same as in the first embodiment. On the other hand, a height position of the oblique plate part 311 in the left/right direction of the vehicle is inclined such that a height position of a portion connected to a standing wall part 318 (corresponding to the standing wall part 218) forming a concave part 321 (corresponding to the concave part 221) is the lowest and the height position gets higher with the approach to a leading end wall part 205.

Also, similar to the oblique plate part 311, the surface part 322 has the same height position in the front/rear direction of the vehicle as in the first embodiment. On the other hand, a height position of the surface part 322 in the left/right direction of the vehicle is inclined such that the height position of the portion connected to the standing wall part 318 forming the concave part 321 is the lowest and the height position gets higher with the approach to the leading end wall part 205. That is, the surface part 322 is inclined such that a height position of a portion at which a base end wall part 203 is connected to the standing wall part 318 is the lowest and a height position gets higher with the approach to a communication opening 232. In other words, the surface part 322 is inclined such that the height position gets higher from a diagonal position of a portion corresponding to the communication opening 232 toward the communication opening 232. For this reason, air can be rapidly discharged from the communication opening 232 by the surface part 322, and an amount of the air accumulated in a passage 233 and a chamber 235 that are located at a front side relative to the communication opening 232 of a reservoir chamber 330 (corresponding to the reservoir chamber 230) can be reduced. That is, it is possible to satisfactorily inject a liquid into the reservoir chamber 330 and store more of the liquid in the reservoir chamber 330. Therefore, it is possible to further increase storage efficiency of the liquid to make the reservoir more compact. Also, since the amount of the air accumulated in the reservoir chamber 330 can be reduced, an appearance of the reservoir chamber 330 when it stores a liquid is improved.

Third Embodiment

Figure 10:
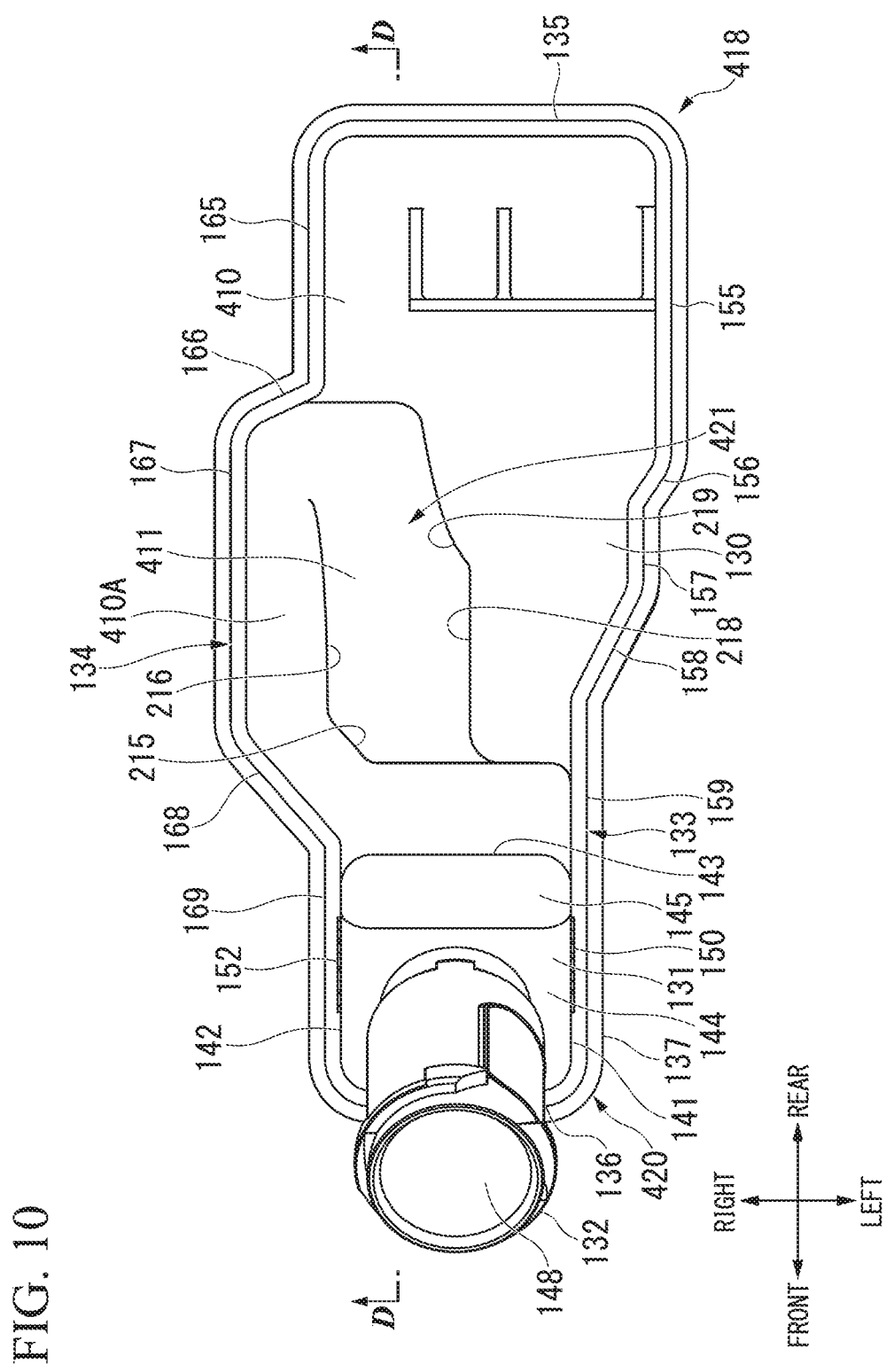
FIG. 10 is a top view illustrating a reservoir body of the reservoir of the second embodiment.
Figure 11:
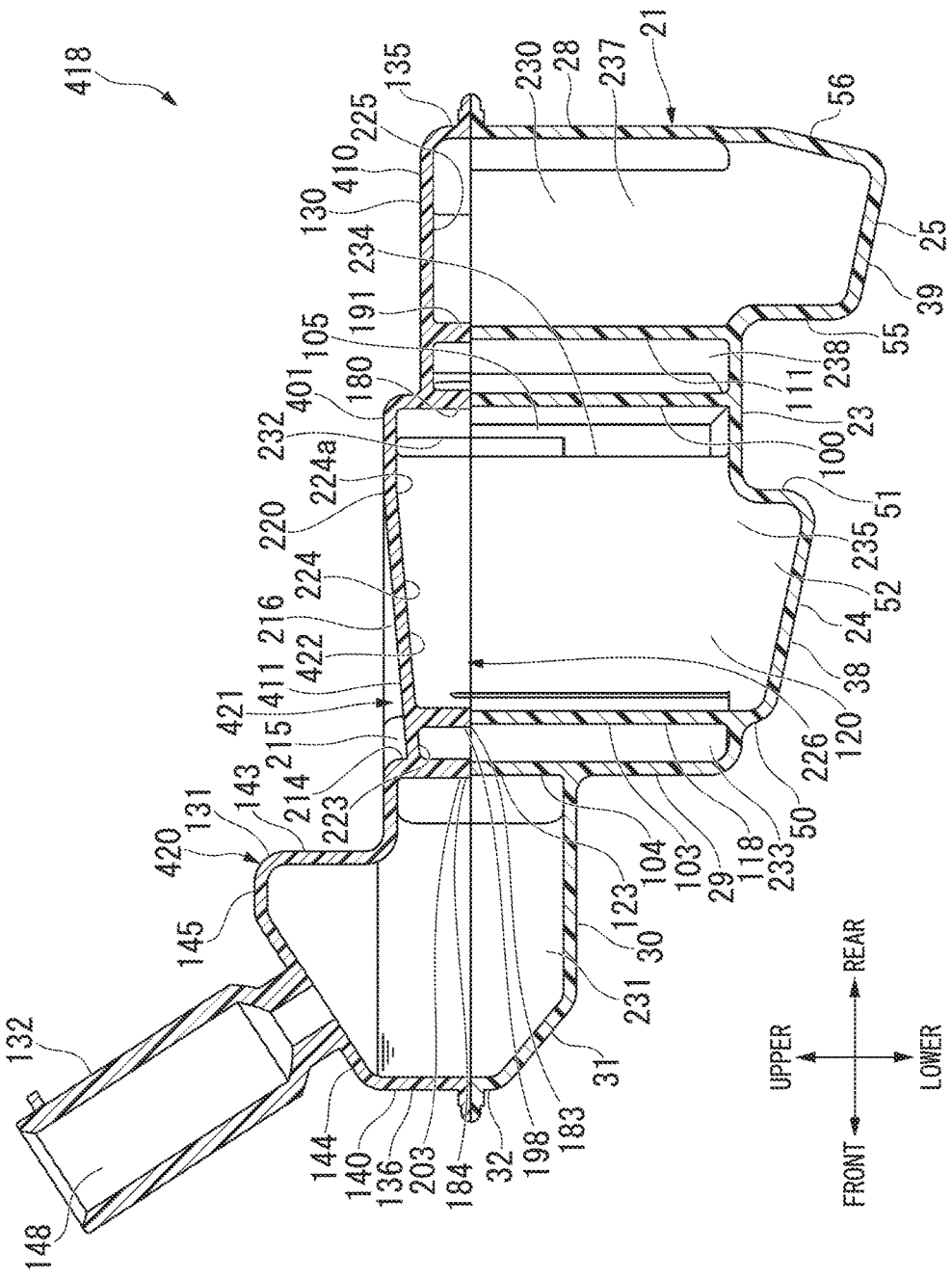
FIG. 11 is a sectional view of cross section D-D of FIG. 10.

Next, a third embodiment will be described on the basis of FIGS. 10 and 11. In the third embodiment, a reservoir body 418 is partly modified from the reservoir body 18 of the first embodiment. To be specific, an upper structure 420 of the reservoir body 418 is partly modified from the upper structure 20. In the first embodiment, to form the surface part 222, the oblique plate part 211 is formed by the concave part 221 recessed to the lower side relative to the main plate part 210. In the third embodiment, a step part 401 protruding to an upper side relative to a main plate part 410 (corresponding to the main plate part 210) is configured to be formed, and an oblique plate part 411 (corresponding to the oblique plate part 211), a concave part 421 (corresponding to the concave part 221), and a communication path roof plate part 410A (corresponding to the communication path roof plate part 210A) are configured to be formed at this step part 401. Thus, a surface part 422 corresponding to the surface part 222 is formed inside the oblique plate part 411. As illustrated in FIG. 11, the oblique plate part 411, the concave part 421, and the surface part 422 have the same structure as the oblique plate part 211, the concave part 221, and the surface part 222 of the first embodiment. Thus, the concave part 421 is formed to be recessed relative to the communication path roof plate part 410A. However, the concave part 421 is formed at an upper side relative to the main plate part 410.

In this way, the third embodiment can also exert the same effects as the first embodiment due to the surface part 422.

In each of the embodiments, the surface part 222, 322 or 422 is formed as an oblique surface, but it is not limited thereto as long as it gets higher from one side of the vehicle toward the communication opening of the other side of the vehicle, and may be configured as a curved surface or a stepped surface.

Each of the present embodiments described above is a reservoir in which an inlet for injecting a liquid from the outside into a reservoir chamber in which the liquid is stored is provided at one side of a vehicle, a communication path extending toward the other side of the vehicle is provided, and a communication opening capable of making communication between the communication path and the reservoir chamber is formed. A surface part that gets higher from one side of the vehicle toward the communication opening of the other side of the vehicle in a state in which the reservoir chamber is mounted in the vehicle is formed at an upper portion of the reservoir chamber. Thereby, the surface part satisfactorily discharges air from the communication opening to reduce an amount of the air accumulated in the reservoir chamber. That is, the liquid can be satisfactorily injected into the reservoir chamber.

In addition, a roof part is formed at the upper portion of the reservoir chamber, and the surface part is formed at a position recessed downward relative to the roof part. Also, in the reservoir in which an upper structure for which the inlet is provided and a lower structure for which the reservoir chamber is provided are fastened and formed, the surface part is formed at the upper structure. Also, the communication opening is formed at a rear side of the reservoir chamber in the front/rear direction of the vehicle, and the surface part is inclined such that a height position rises from a front side toward a rear side in the front/rear direction of the vehicle. In addition, a highest liquid level indicator line in the reservoir is formed at an upper position in a vertical direction relative to the surface part.

INDUSTRIAL APPLICABILITY

According to the aforementioned reservoir, the liquid can be satisfactorily injected.

REFERENCE SIGNS LIST

11: Reservoir
132: Inlet
222: Surface part
230: Reservoir chamber
231: Communication path
232: Communication opening

The invention claimed is:

1. A reservoir configured to be assembled to a vehicle, the reservoir comprising:
   an inlet provided at one side of the vehicle to inject a liquid from an outside into a reservoir chamber in which the liquid is stored;
   a communication path provided to extend from the inlet toward another side of the vehicle; and
   a communication opening capable of making communication between the communication path and the reservoir chamber,
   wherein a surface part is formed at an upper portion of the reservoir chamber, wherein the surface part is configured to get higher with respect to a horizontal plane from the one side of the vehicle toward the communication opening of the another side of the vehicle in a state in which the reservoir chamber is mounted in the vehicle, and
   wherein a roof part is formed at the upper portion of the reservoir chamber, and the surface part is formed at a position recessed downward relative to the roof part.

2. The reservoir according to claim 1, wherein:
   the communication opening is formed at a rear side of the reservoir chamber in a front/rear direction of the vehicle; and
   the surface part is inclined such that a height position gets higher from a front side toward a rear side in the front/rear direction of the vehicle.

3. The reservoir according to claim 1, wherein a highest liquid level indicator line in the reservoir is formed at an upper position in a vertical direction relative to the surface part.

4. A reservoir configured to be assembled to a vehicle, the reservoir comprising:
   an inlet provided at one side of the vehicle to inject a liquid from an outside into a reservoir chamber in which the liquid is stored;
   a communication path provided to extend from the inlet toward another side of the vehicle;
   a communication opening capable of making communication between the communication path and the reservoir chamber;
   an upper structure for which the inlet is provided; and
   a lower structure for which the reservoir chamber is provided,
   wherein the upper structure and the lower structure are fastened to form a reservoir body,
   wherein a surface part, formed at an upper portion of the reservoir chamber, is configured to get higher with respect to a horizontal plane from the one side of the vehicle toward the communication opening of the another side of the vehicle in a state in which the reservoir chamber is mounted in the vehicle, and the surface part is formed at the upper structure.

5. The reservoir according to claim 4, wherein:

the communication opening is formed at a rear side of the reservoir chamber in a front/rear direction of the vehicle; and the surface part is inclined such that a height position gets higher from a front side toward a rear side in the front/rear direction of the vehicle.

6. The reservoir according to claim 4, wherein a highest liquid level indicator line in the reservoir is formed at an upper position in a vertical direction relative to the surface part.

7. The reservoir according to claim 2, wherein a highest liquid level indicator line in the reservoir is formed at an upper position in a vertical direction relative to the surface part.

8. The reservoir according to claim 5, wherein a highest liquid level indicator line in the reservoir is formed at an upper position in a vertical direction relative to the surface part.

* * * * *